J. AUSTIN.
Wheel Cultivator.
No. 41,899
Patented Mar 15, 1864.
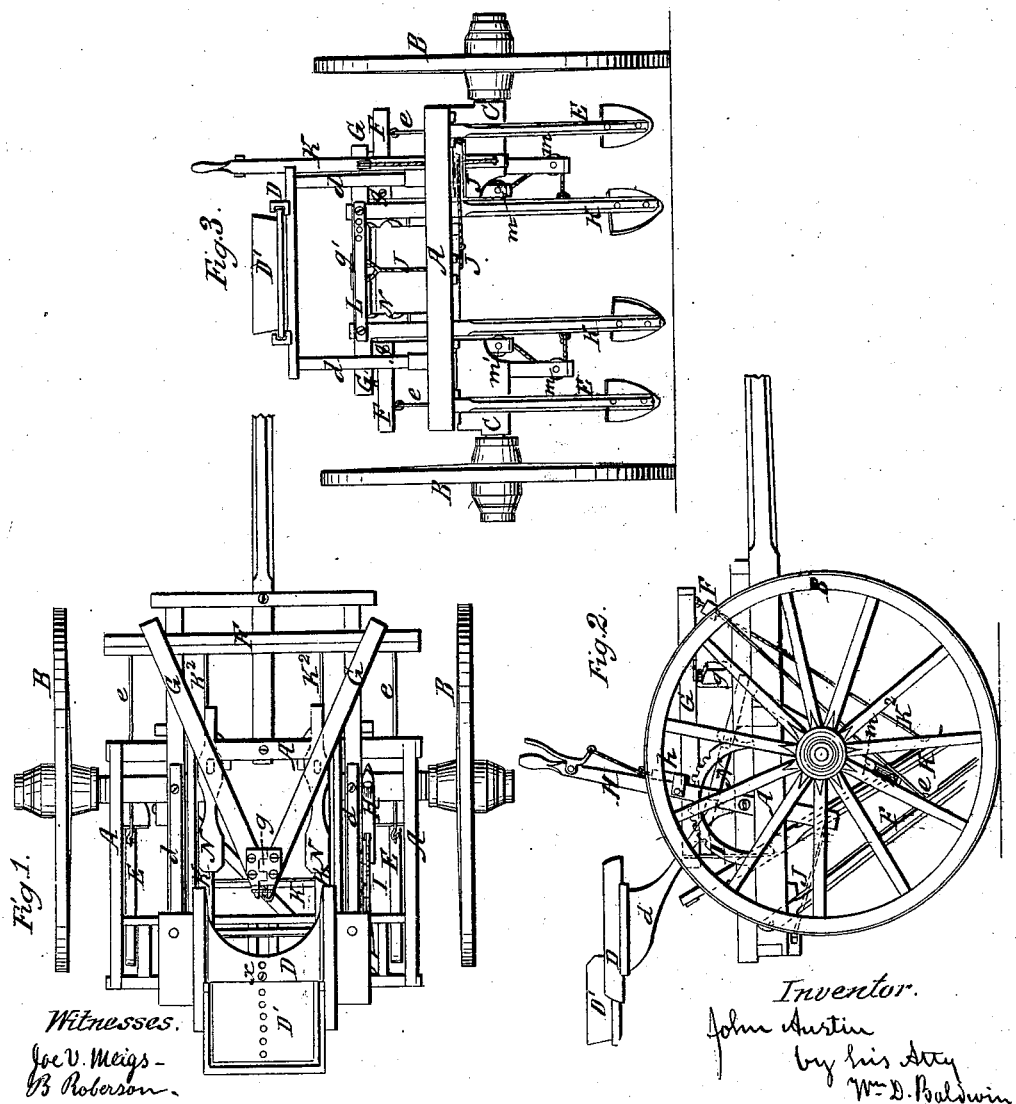

UNITED STATES PATENT OFFICE.

JOHN AUSTIN, OF ROCKFORD, ILLINOIS.

IMPROVEMENT IN CULTIVATORS.

Specification forming part of Letters Patent No. 41,899, dated March 15, 1864.

*To all whom it may concern:*

Be it known that I, JOHN AUSTIN, of Rockford, in the county of Winnebago and State of Illinois, have invented certain new and useful Improvements in Cultivators, of which the following is a full, clear, and exact description, reference being had to the accompanying drawings, which make part of this specification, and in which—

Figure 1 represents a plan or top view of a cultivator embracing my improvements; Fig. 2, a view in elevation of one side of the same, and Fig. 3 a similar view of the same as seen from the rear.

In the accompanying drawings my improved cultivator is shown as consisting mainly of a stout frame, A, supported upon two wheels, B, mounted upon independent short axles or journals C, bolted to the under side of the frame, by which arrangement the space beneath the frame is left unobstructed, which is a great desideratum in working tall crops.

The driver's seat D rests upon two standards or arms, d, which are bolted to the frame in the line of the axles and incline backward and upward. The seat proper is made in two portions, the upper one, D', of which slides in the lower part on ways, so that it can readily be shifted backward or forward at pleasure. It can also be held in any desired position by means of a stop pin or screw, x, as shown in Fig. 1. By this means the weight of the driver causes the rear of the machine to preponderate, and thus both counterbalance the weight of the forward part of the machine and the tendency of the plows to draw down the front of the machine when in operation.

The shanks of the outer plows, E, are pivoted at their upper ends to the rear end of the frame A, and connected near their lower ends by rods or chains e to a cross-bar, F, hinged or pivoted to the front ends of two rocking levers, G, which are in turn pivoted to upright arms or standards g on the frame A, and converge toward their rear ends, where they are united by a hinge, g', the three levers thus forming a triangular frame, all of which is above the main frame A, and consequently out of the way of the standing crop.

A hand-lever, H, is pivoted to one side of the frame A, within convenient reach of the driver's seat, in such manner as to play freely back and forth in a vertical plane. A semicircular rack, I, is bolted to the side of the frame and passes through a slot in the hand-lever, which is held in any desired position by a spring-detent, h, which takes into the notches of the rack I. A cord or chain, J, is secured to the lower end of the hand-lever, and passes around the pulleys $j$ $j'$ to the rear end of the levers G, to which it is secured. By this means the driver can at any time regulate the depth to which the plows enter the soil by moving the lever H back or forth.

The shanks K of the inner plows are pivoted to a rod, K', on the frame, and extend above it, their distance apart being regulated by a series of holes in the cross-bar L, which connects their upper ends. The lower ends of the shanks are connected to the cross-bar F by means of rods or chains $k^2$, and are raised and lowered by them in a manner similar to the outer plows, as hereinbefore described.

In order to regulate the lateral movements of the inner plows so as to vary their position relatively to the outer plows and to the crop, a cord or chain, M, is attached to the shanks K, passing over pulleys $m$ $m'$ to the front ends of two rocking levers, N, pivoted upon the frame above the axle of the wheels, one on each side of the driver's seat, and in a position where they can readily be reached by his feet.

By the foregoing description it will be seen that the arrangement of the seat is such that the driver can shift it back or forth at pleasure to counteract the tendency of the plows to drag or dig into the soil when the machine is advancing. The location of this seat is such that he can readily grasp the hand-lever and its detent, by which the plows are raised or lowered. He can likewise at the same time readily perceive the position of the plants to be cultivated, and by working the levers N with his feet can readily shift the inner plows from side to side, and thus cultivate irregular rows without inconvenience or danger of plowing up the plants. By the triangular arrangement of the levers F and G and the mode in which they are hinged a strong, compact, and convenient arrangement of parts is secured, and while sufficiently flexible in any required direction they are quite rigid to transverse strains, and consequently do not play or wabble about, which would have a tendency to strain them.

It will thus be perceived that the entire lifting mechanism is arranged above the main frame A, the under side of which is above the plane of the axles of the wheels, thus leaving the central space between the inner shifting-plows entirely unobstructed, and enabling me to cultivate much taller crops than could be done in those machines having their lifting mechanisms below the frame, as has heretofore generally been the case, so far as my knowledge extends.

I do not claim broadly under this patent any of the devices herein described *per se;* but,

Having thus described the construction and mode of operation of my improved cultivator, what I do claim therein as new, and desire to secure by Letters Patent, is—

1. The combination of the shifting driver's seat D' with the main frame A and laterally-shifting plows K, in the manner described, for the purpose of enabling the driver to balance the machine and control both the vertical and the lateral movements of the plows, as set forth.

2. The combination of the main frame A and compound lever-frame F G with the plows E K, when the several parts are arranged and operate as described, for the purposes set forth.

3. The combination of the adjustable driver's seat, the foot-levers N, and the laterally-adjustable plows K, when severally arranged relatively to the main frame A, and operating in the manner and for the purpose described.

In testimony whereof I have hereunto subscribed my name.

JNO. AUSTIN.

Witnesses:
 EDWIN DAY,
 SILAS G. TYLER.